(No Model.) 2 Sheets—Sheet 1.
W. W. MACFARLANE.
MACHINE FOR CUTTING FABRICS.
No. 424,425. Patented Mar. 25, 1890.
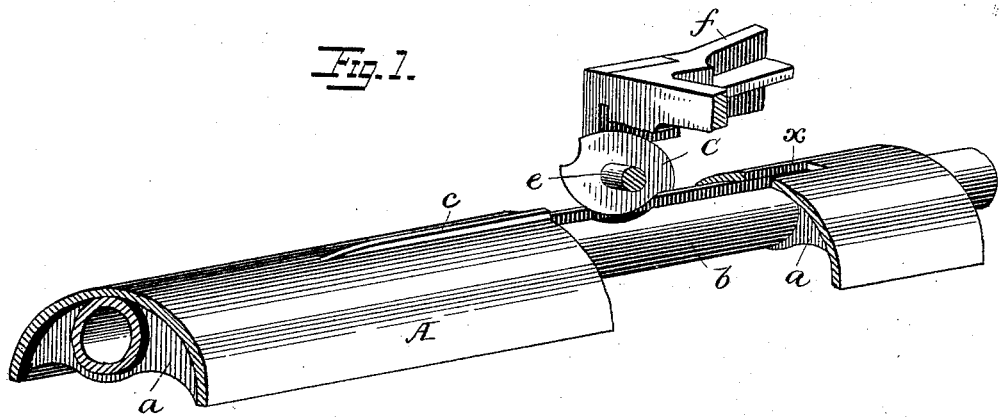
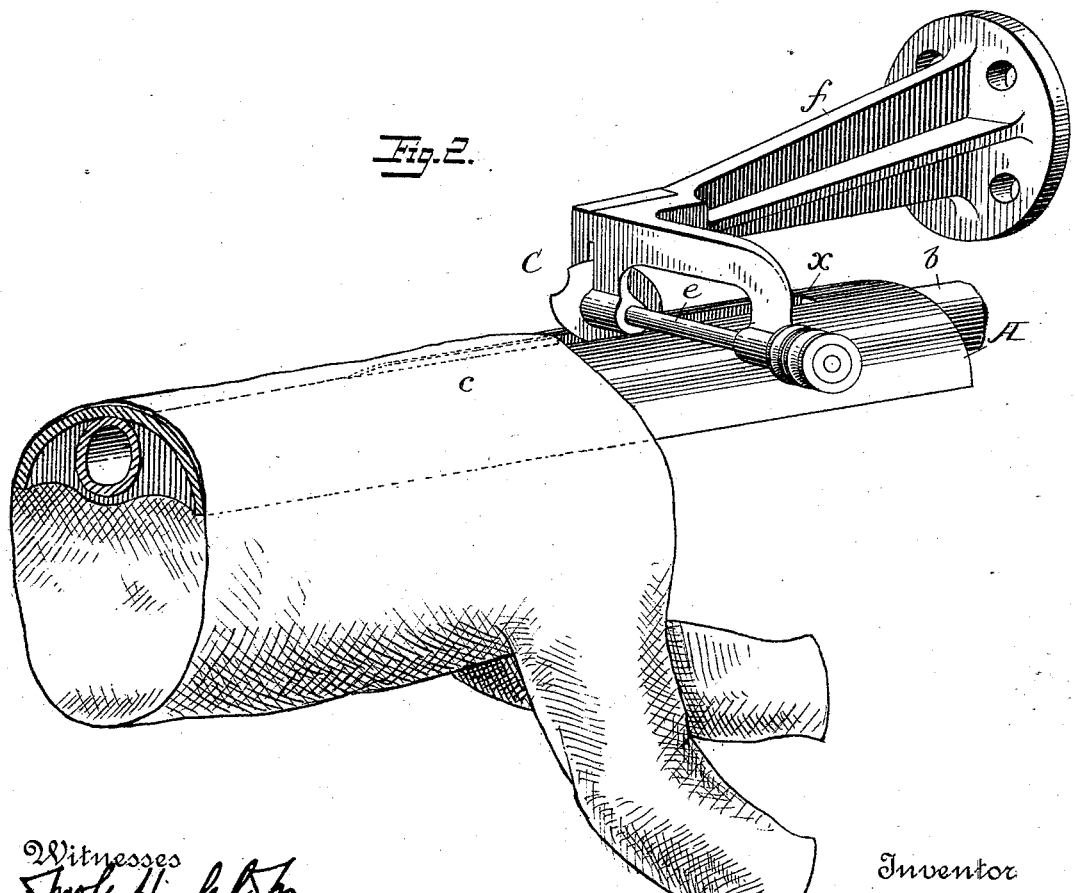

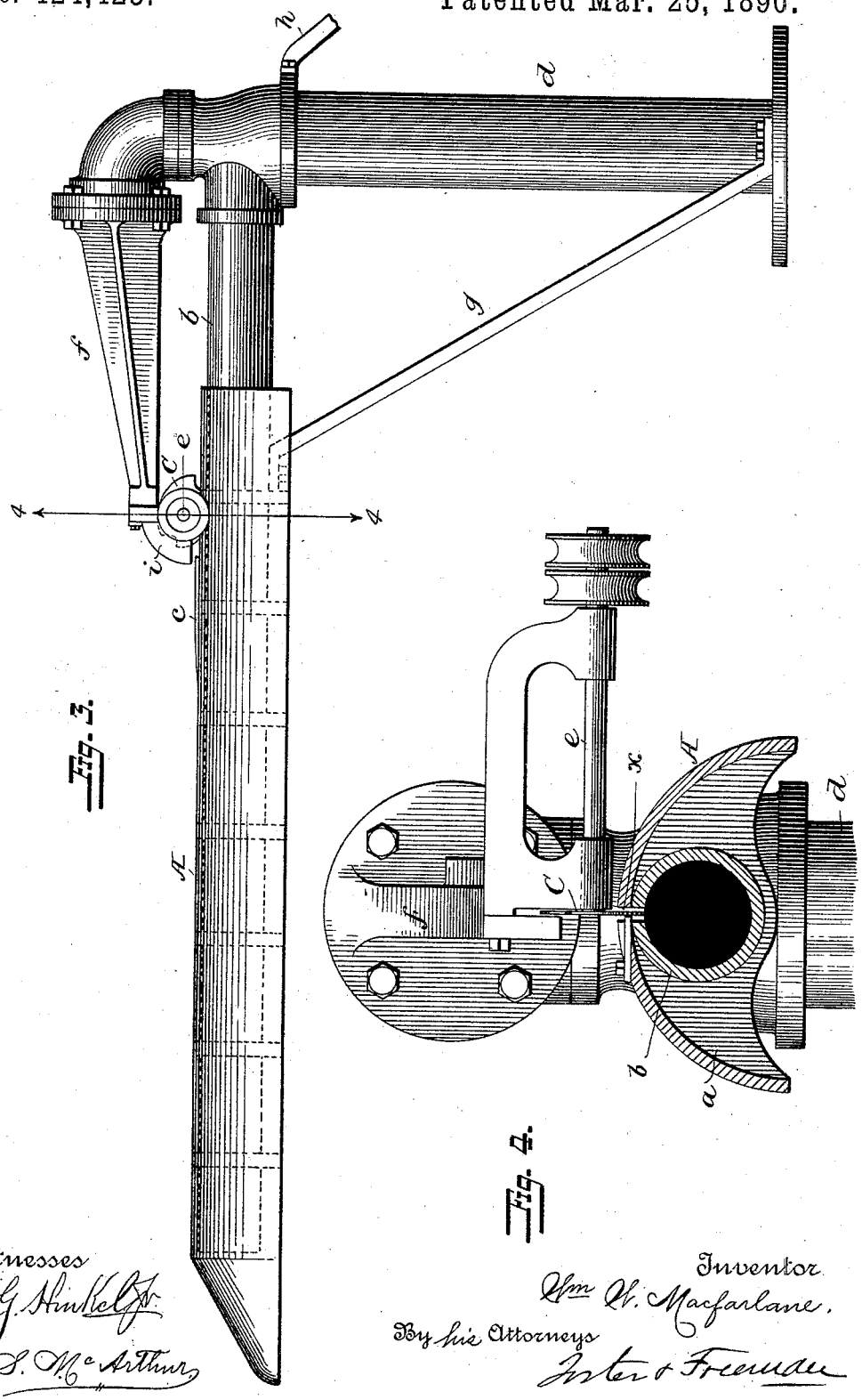

UNITED STATES PATENT OFFICE.

WILLIAM W. MACFARLANE, OF PHILADELPHIA, PENNSYLVANIA, ASSIGNOR TO THE QUAKER CITY DYE WORKS COMPANY, OF SAME PLACE.

MACHINE FOR CUTTING FABRICS.

SPECIFICATION forming part of Letters Patent No. 424,425, dated March 25, 1890.

Application filed November 15, 1889. Serial No. 330,439. (No model.)

*To all whom it may concern:*

Be it known that I, WILLIAM W. MACFARLANE, a citizen of the United States, residing at Philadelphia, in the county of Philadelphia and State of Pennsylvania, have invented certain new and useful Improvements in Machines for Cutting Fabrics, of which the following is a specification.

The object of my invention is to cut lengthwise woven or knit tubular fabrics, as Jersey cloth, stockinet, webbing, &c., along the seams formed lengthwise in such fabrics; and my invention consists of a machine whereby the fabric may be fed in a straight line directly to the cutter, so as to avoid cutting into the body of the fabric, as fully set forth hereinafter, and as illustrated in the accompanying drawings, in which—

Figure 1 is a perspective view illustrating the essential features of the machine; Fig. 2, the same showing a piece of fabric in the act of being cut; Fig. 3, a side view of the machine; and Fig. 4, an enlarged section on the line 4 4, Fig. 3.

The main operating parts of the machine are illustrated in Fig. 1, in which C illustrates a revolving knife, which may be of any suitable shape, as circular, elliptical, or, as shown, with two shoulders, and A is a support for the article to be cut, which is provided with a rib $c$, and which may be suitably supported with the said rib in the same vertical plane as the cutter. The tubular or other knitted fabric to be cut along a seam or row or stitching is placed upon the support A, with the seam that is to be cut directly upon the edge of the rib $c$, and the fabric is then moved forward upon said rib until it is brought against the cutter which severs the fabric, the rib serving to guide the latter continuously in a straight line, so that the seam only will be cut without cutting into the body or any portion of the fabric.

The parts above described may be constructed and connected in any suitable manner in an organized machine. Thus, as illustrated in the drawings, the support A is made of a bent sheet of metal, braced by means of wooden cross-pieces or frames $a$, and rests upon a horizontal projecting arm $b$, secured to and forming part of the frame of the machine, consisting of the said arm, a standard $d$, adapted to be bolted to the floor, and the arm $f$, which overhangs the arm $b$ and has bearings for the spindle $e$ of the revolving cutter C. Suitable braces $g$ $h$ serve to support the parts, and the spindle of the cutter is driven by means of a belt and pulley or otherwise, so as to impart the desired motion to the cutter.

In order to protect the operator, the revolving cutter is in most cases covered, except at a point adjacent to the support A, by a shield $i$, as shown in Fig. 3.

As it is desirable to set the cutter opposite the end rib $c$, and therefore extending below the latter, the arm $b$ and support A are provided with longitudinal slots $x$, into which the lower part of the cutter extends.

It will be evident that the frame or parts supporting the support A, the shaft of the cutter, and the rib $c$ may be constructed in different ways. It will also be evident that the cutter may be a revolving cutter or a reciprocating cutter.

Without limiting myself to the precise construction shown, I claim—

1. In a machine for cutting fabrics, the combination of a cutter supported by stationary bearings, a lateral fixed support for the fabric, and a rib arranged upon said support in front of the cutter and in the same plane therewith, substantially as set forth.

2. The combination, in a machine for cutting fabrics, of a frame provided with an arm $b$, a curved plate $a$, supported on said arm and provided with a rib $c$, and a cutter supported in stationary bearings upon the frame in the same plane with said rib, substantially as set forth.

3. A machine for cutting fabrics, consisting of a vertical post $d$, a lateral arm $b$ above the base of the post, an arm $f$, overhanging the arm $b$, a single revolving cutter supported in bearings upon the arm $f$, and support A for the fabric resting upon the arm $b$, and provided with a rib $c$, and a slot $x$, to receive the cutter, substantially as set forth.

In testimony whereof I have signed my name to this specification in the presence of two subscribing witnesses.

WM. W. MACFARLANE.

Witnesses:
S. CHAS. PANCOAST,
H. B. LATTA.